W. S. BROWN, DEC'D.
G. BROWN, ADMINISTRATRIX.
NUT LOCK.
APPLICATION FILED SEPT. 2, 1915.

1,182,892.

Patented May 16, 1916.

Witnesses
Edw. S. Hall.
Wade Koontz

Inventor
William S. Brown deceased
Gertie Brown administratrix.
By Richard Owen,
Attorney

UNITED STATES PATENT OFFICE.

WILLIAM S. BROWN, DECEASED, LATE OF TULSA, OKLAHOMA, BY GERTIE BROWN, ADMINISTRATRIX, OF TULSA, OKLAHOMA.

NUT-LOCK.

1,182,892.  Specification of Letters Patent.  Patented May 16, 1916.

Application filed September 2, 1915. Serial No. 48,698.

*To all whom it may concern:*

Be it known that WILLIAM S. BROWN, deceased, late a citizen of the United States residing at Tulsa, in the county of Tulsa and State of Oklahoma, invented new and useful Improvements in Nut-Locks, of which the following is a specification.

This invention relates to nut locks and the object of the same is to provide an improved nut lock of the superposed nut type.

More specifically this invention provides a pair of oppositely threaded nuts having complemental teeth, one of the nuts having a cavity formed therein to receive a portion of the other nut so as to provide for an efficient engagement of the teeth.

A still further object of this invention resides in the provision of a device that is simple in construction, efficient in operation and consists of a minimum number of parts and can, therefore, be manufactured for the minimum amount.

With these and other objects in view, this invention consists of certain novel constructions, combinations, and arrangement of parts, as will be hereinafter fully described and claimed.

Figure 1:
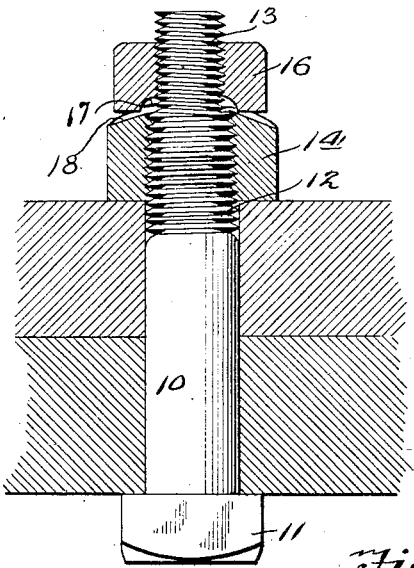
Figure 2:
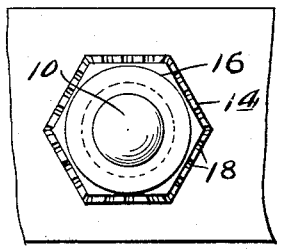
Figure 3:
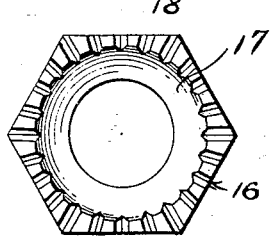
Figure 4:
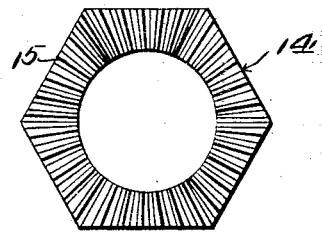

In the accompanying drawings: Figure 1 is a side elevation of a bolt and the improved nuts threaded thereon, the same being shown in section; Fig. 2 is a top plan view of the device as shown in Fig. 1; Fig. 3 is a bottom plan view of one of the nuts used with this device; Fig. 4 is a bottom plan view of the other nut used with this device.

Referring to the parts by reference numerals, a bolt is designated by the numeral 10 having a head 11 formed at one end thereof and at the opposite end, a threaded portion 12 and a second threaded portion 13, the threads on the portion 13 being disposed oppositely to those on the portion 12. A nut 14 is provided, the same being adapted for threaded engagement with a portion 12 of the bolt 10 and has one face thereof provided with inclined arranged teeth 15. A second nut 16 is provided, the same being adapted for threaded engagement with the portion 13 of the bolt 10 and has a circularly disposed cavity 17 and a plurality of gripping teeth 18. As is clearly shown in Fig. 3, these teeth 18 and the cavity 17 are formed in the same face of the nut.

When the device is in use the nut 14 is threaded on the portion 12 of the bolt 10 and the nut 16 is threaded upon the portion 13 of the bolt 10, the said nuts thus being rotated in the opposite direction. The teeth 15 and 16 are thus so arranged to provide an engagement and the teeth 15 on the nut 14 being positioned on an incline, the inner portion of the same project into the cavity 17 in the nut 16 and the inner edge of the teeth 18 engages the teeth 15 at a point substantially intermediate the length thereof. With the nuts arranged in the position as above described and shown in Fig. 1, the independent rotation of the same on the bolt is thus prevented because of the oppositely threaded portions the same are secured on.

It is obvious that minor changes may be made in the form and construction of this device without departing from the material parts thereof. It is, therefore, not wished to confine the invention to the exact form and construction herein shown and claimed but it is wished to include all such as properly come within the scope claimed.

What is claimed is:—

In combination with a bolt having a right and left hand threaded portion thereon, a nut threaded on one of said threaded portions having one face thereof provided with a plurality of inclined teeth, a second nut threaded on the other of said threaded portions of said bolt having a circularly arranged cavity formed therein, and a plurality of teeth on one face thereof, the inner portion of said teeth on said first mentioned nut adapted for placement in said cavity in said second mentioned nut and the inner edges of said teeth on said second mentioned nut adapted to engage said teeth on said first mentioned nut at a point substantially intermediate the length of the same whereby said nuts are secured together and the independent rotation of the same on said bolt is prevented.

In testimony, I affix my signature in presence of two witnesses.

GERTIE BROWN,
*Administratrix of the estate of William S. Brown, deceased.*

Witnesses:
W. W. BROWN,
E. A. GUNTER.